United States Patent [19]

Lapeyre

[11] Patent Number: 4,815,271
[45] Date of Patent: Mar. 28, 1989

[54] DETACHABLE LINK CHAIN

[75] Inventor: James M. Lapeyre, New Orleans, La.

[73] Assignee: The Laitram Corporation, New Orleans, La.

[21] Appl. No.: 858,597

[22] Filed: May 1, 1986

Related U.S. Application Data

[63] Continuation of Ser. No. 639,308, Aug. 9, 1984, Pat. No. 4,597,747, which is a continuation-in-part of Ser. No. 210,861, Nov. 26, 1980, Pat. No. 4,473,365.

[51] Int. Cl.4 .......................................... F16G 13/12
[52] U.S. Cl. ................................. 59/84; 59/900; 59/85; 59/90; 198/853; 474/232
[58] Field of Search .............. 59/84, 85, 90, 78, 900; 474/212, 242, 232, 227, 226, 206, 233, 234, 235; 198/853, 851, 852, 850

[56] References Cited

U.S. PATENT DOCUMENTS

| | | | |
|---|---|---|---|
| 62,204 | 2/1867 | Jenks | 59/78 |
| 237,591 | 2/1881 | Pope | 474/232 |
| 377,120 | 1/1888 | Schofield | 474/232 |
| 382,554 | 5/1888 | Redick | 472/232 |
| 433,965 | 8/1890 | Sheldrick | |
| 2,766,635 | 10/1956 | Schwarzkopf | |
| 3,095,753 | 7/1963 | Lengyel | 198/850 |
| 3,431,724 | 3/1969 | Stener | 59/90 |
| 3,453,823 | 7/1969 | Mondt | 59/90 |
| 3,628,834 | 12/1971 | Anderson | 198/853 |
| 3,669,923 | 12/1971 | Lengyel | 74/254 |
| 3,879,935 | 4/1975 | Fischer | 59/85 |
| 4,050,323 | 9/1977 | I'Anson | 59/90 |
| 4,438,838 | 3/1984 | Hodlewsky et al. | 198/853 |
| 4,473,365 | 9/1984 | Lapeyre | 59/85 |

FOREIGN PATENT DOCUMENTS

| | | |
|---|---|---|
| 51232 | 5/1889 | Fed. Rep. of Germany . |
| 54663 | 5/1890 | Fed. Rep. of Germany . |
| 948166 | 1/1949 | France . |
| 1270041 | 7/1961 | France ...... 59/90 |
| 211957 | 2/1924 | United Kingdom . |
| 866641 | 4/1961 | United Kingdom . |

Primary Examiner—David Jones
Attorney, Agent, or Firm—Weingarten, Schurgin, Gagnebin & Hayes

[57] ABSTRACT

A transmission or conveyor chain composed of a plurality of interconnected identical links which are attachable and detachable without need for pivot pins or other separate connecting hardware. Each link is preferably molded as a unitary structure of plastic material.

1 Claim, 7 Drawing Sheets

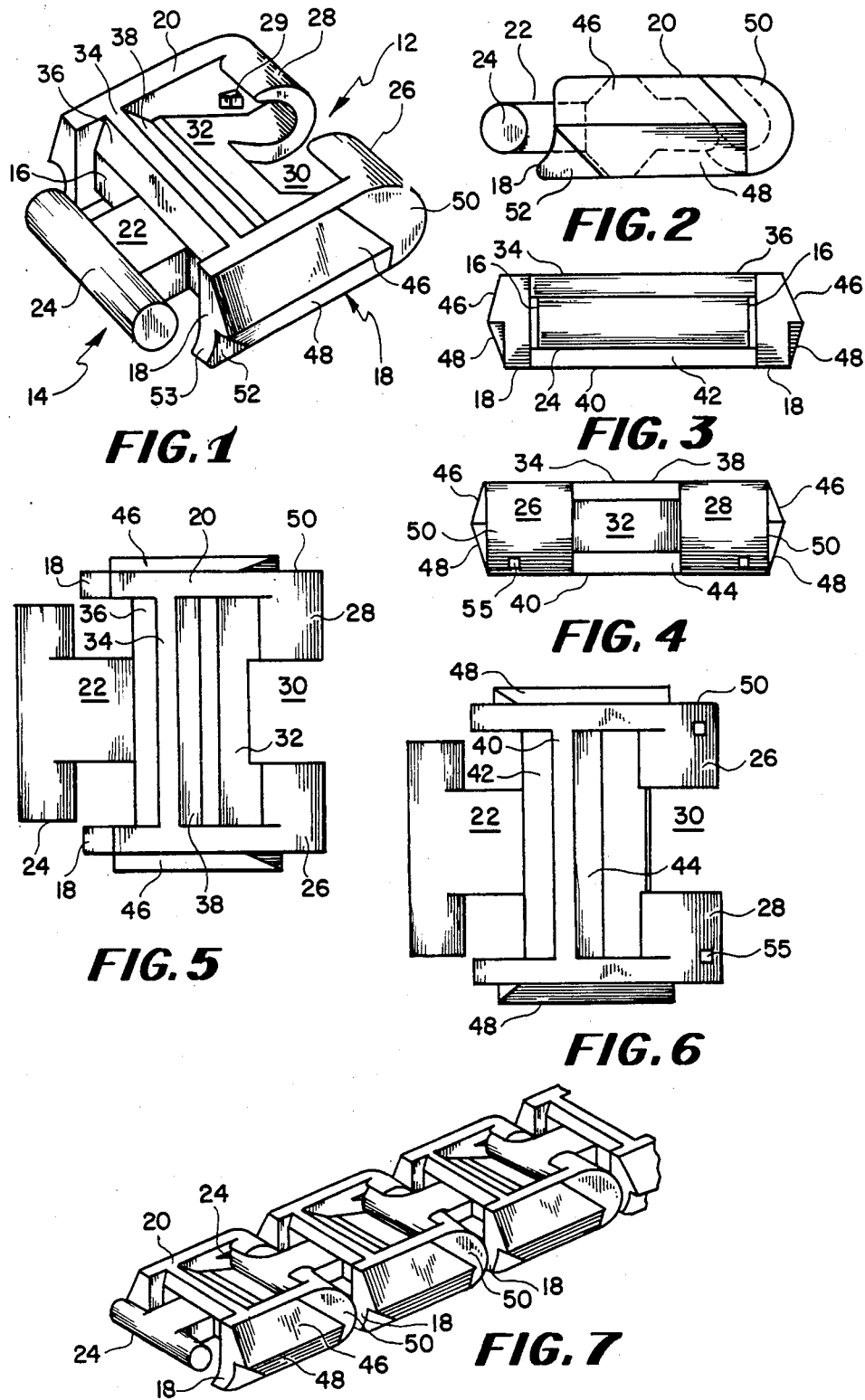

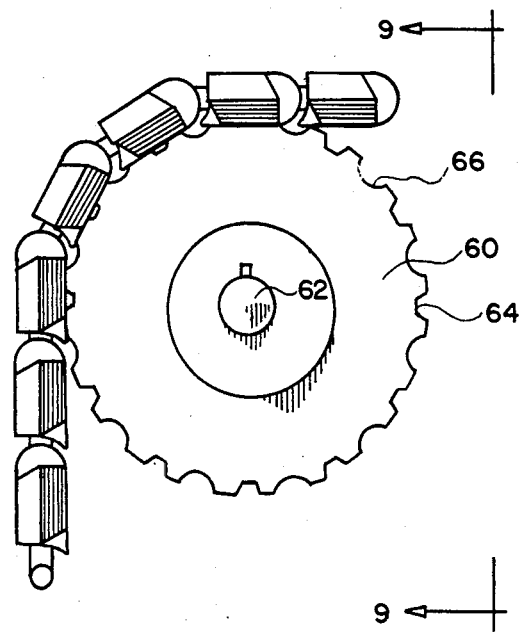
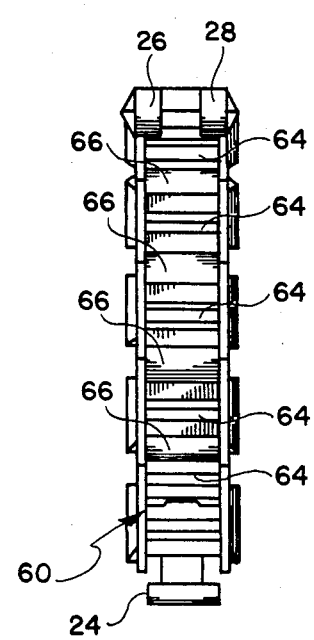
FIG. 8  FIG. 9
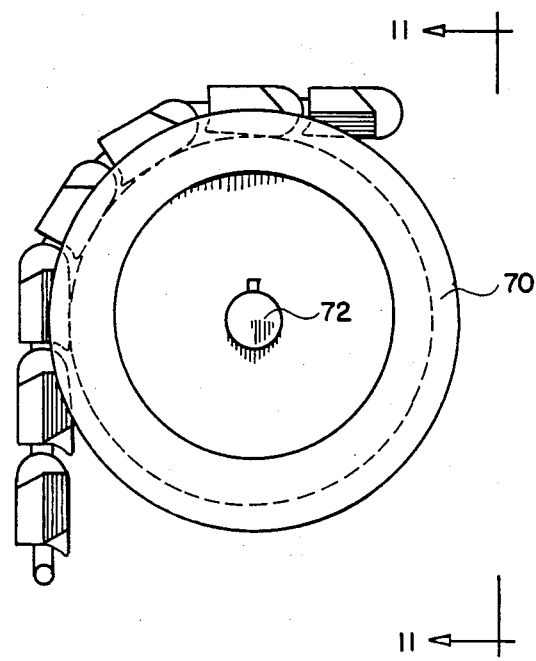
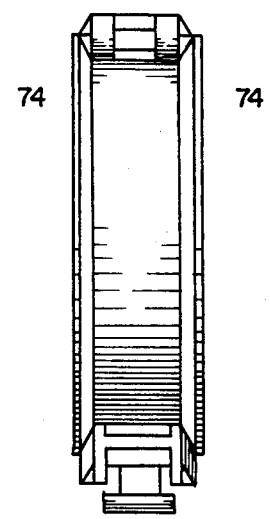
FIG. 10  FIG. 11

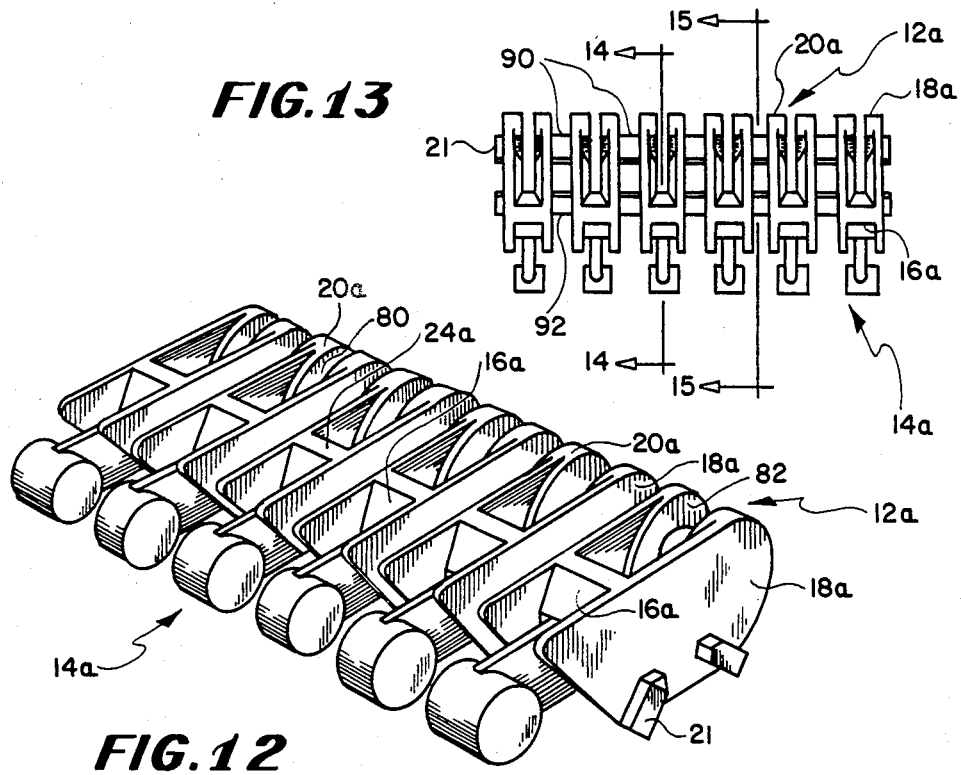
FIG. 13
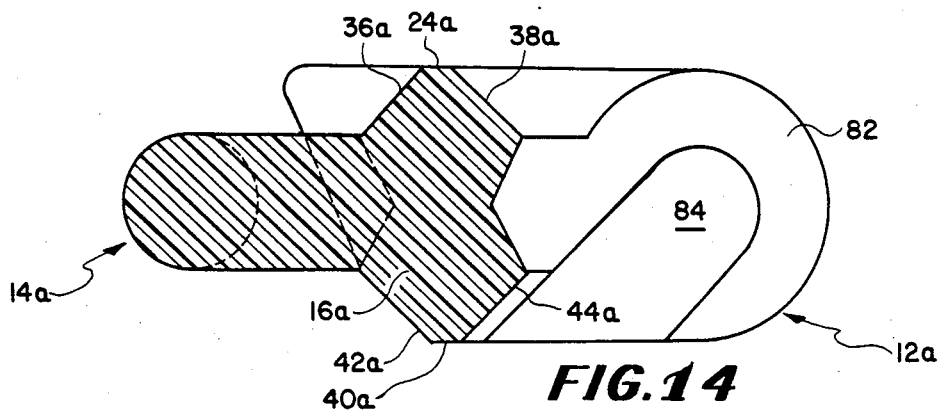
FIG. 12
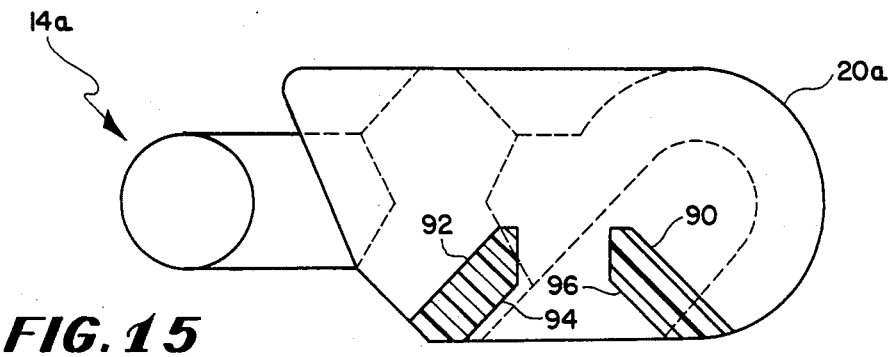
FIG. 14
FIG. 15

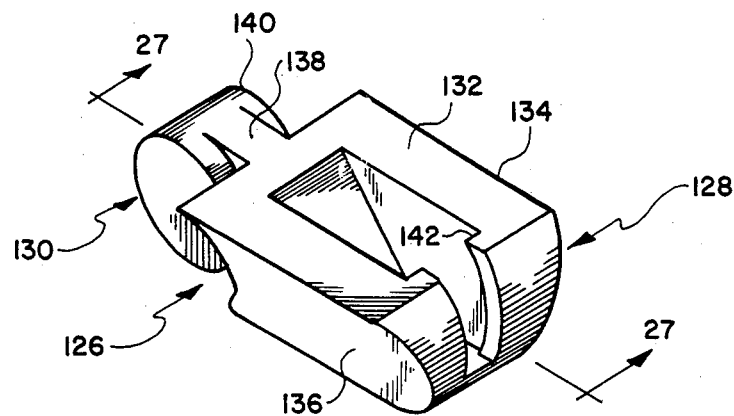
FIG. 25
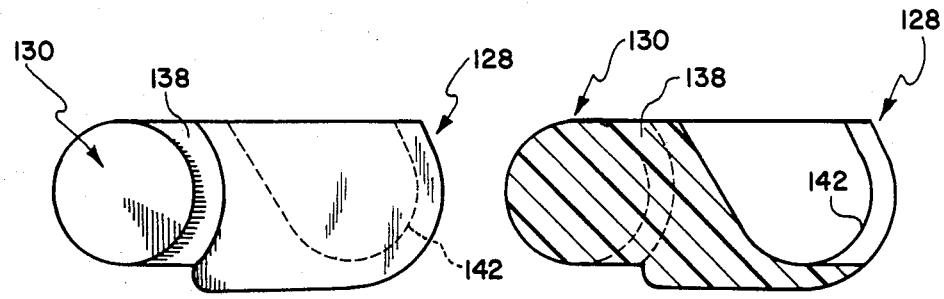
FIG. 26  FIG. 27
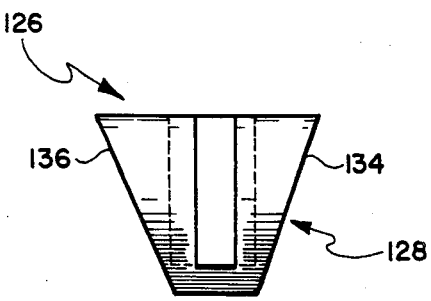 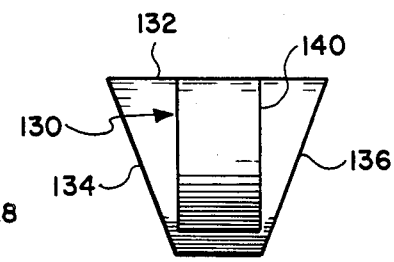
FIG. 28  FIG. 29

DETACHABLE LINK CHAIN

CROSS REFERENCE TO RELATED APPLICATIONS

This is a continuation of application Ser. No. 639,308, filed on Aug. 9, 1984, which is now U.S. Pat. No. 4,597,747, which is a continuation-in-part of Ser. No. 210,861, filed 11-26-80, which is now U.S. Pat. No. 4,473,365 which issued on 9-25-84.

FIELD OF THE INVENTION

This invention relates to link structures, and more particularly to a multiple link chain composed of identical detachable links.

BACKGROUND OF THE INVENTION

Various forms of multiple link chains are known and generally include links which are pivotally connected to like links by means of pivot pins to permit relative pivotal movement of adjacent links about the axis of the pivot pin. The chain is usually driven by a sprocket wheel in which sprocket teeth are arranged to engage the link ends through which the pivot pin is disposed for driving of the chain at the link ends.

A novel link chain is described in co-pending application Ser. No. 013,165, filed Feb. 21, 1979, entitled Link Chain Belt in which a driving tooth on each link protrudes therefrom at a position intermediate the pivot axes at the link ends. The location of the driving tooth midway between the pivot axes and the configuration of the driving tooth surfaces, when employed in conjunction with an associated sprocket wheel configuration, exhibits substantially low scrubbing action and small chordal action. Scrubbing action is known in relation to chain belts wherein the link teeth and sprocket teeth engage one another with a scrubbing or rubbing contact. Chordal action in chain drives is also known and comprises a vibratory motion of the chain as it engages the sprocket wheel.

SUMMARY OF THE INVENTION

In brief, the present invention provides a link chain composed of a plurality of interconnected identical links which are attachable and detachable without need for pivot pins or any separate connecting hardware. A center tooth is disposed between the pivot axes of each link, as in the aforesaid co-pending application, for efficient drive about an associated sprocket wheel with minimal scrubbing and chordal action. Each link includes a link body having respective ends spaced along the longitudinal axis of the link body, with a pivot axis defined at each end and a driving tooth disposed midway between the pivot axes. One end of the link includes oppositely-extending cylindrical posts or rods disposed along a pivot axis which is orthogonal to the longitudinal axis of the link body. The other end of the link includes arcuate receptacle or hook portions which are pivotably attachable to the posts of an adjacent link for pivotable movement of attached links about the pivot axis. The center tooth is engageable with an associated sprocket wheel for driving of the link chain. The sides of each link can include beveled surfaces for mating with a V-pulley such that the link chain can be alternatively driven or guided by a V-pulley rather than, or in addition to, a sprocket wheel. In another embodiment, each of the links of the link chain of the present invention have a recess for receiving a tooth of a sprocket wheel. The sprocket wheel tooth receiving recess can advantageously be either centrally formed in the link body, or laterally formed to one or both sides of the link body. In a further embodiment, the sides of each link are planar and inclined in such a way as to define a body shape that mates with a V-pulley drive rather than using either teeth or recesses. In a preferred embodiment, the links are symmetrical about a central plane extending through the link body such that either the top or bottom of the links can be engaged by a sprocket wheel or a V-pulley. In other preferred embodiments, the links are asymmetrical about a central plane and can be engaged from the bottom either by a sprocket wheel or a V-pulley. In preferred construction, the links of the several embodiments are molded of a suitable plastic material as an integral unitary structure.

The link chain can be used as a transmission chain or as a conveyor chain. As a conveyor, the link can be composed of a plurality of link portion, each of a type substantially as described above, such that the conveyor link has an array of post ends and an array of hook ends which are mateable with like conveyor links. The conveyor links can be fabricated in multiples of a given width so that conveyors can be built up of any intended overall width.

DESCRIPTION OF THE DRAWINGS

The invention will be more fully understood from the following detailed description taken in conjunction with the accompanying drawings, in which:

FIG. 1 is a pictorial view of a link according to the invention;

FIG. 2 is a side elevation view of the link of FIG. 1;

FIG. 3 is an end elevation view of the post end of the link of FIG. 1;

FIG. 4 is an end elevation view of the hook end of the link of FIG. 1;

FIG. 5 is a top view of the link of FIG. 1;

FIG. 6 is a bottom view of the link of FIG. 1;

FIG. 7 is a pictorial view of the interconnected links of FIG. 1 forming a link chain;

FIG. 8 is an elevation view of the link chain in engagement with a sprocket wheel;

FIG. 9 is an elevation view taken along line 9—9 of FIG. 8;

FIG. 10 is an elevation view of the link chain in engagement with a V-pulley;

FIG. 11 is an elevation view taken along 11—11 of FIG. 10;

FIG. 12 is a pictorial view of a conveyor link according to the invention;

FIG. 13 is a top view of the link of FIG. 12;

FIG. 14 is a sectional view taken along line 14—14 of FIG. 13;

FIG. 15 is a sectional view taken along line 15—15 of FIG. 13;

FIG. 25 is a pictorial view of another link according to the present invention;

FIG. 26 is a side elevation view of the link of FIG. 25;

FIG. 27 is a sectional view along line 27—27 of FIG. 25;

FIG. 28 is an end elevation view of the hook end of the link of FIG. 25; and

FIG. 29 is an end elevation view of the post end of the link of FIG. 25.

DETAILED DESCRIPTION OF THE INVENTION

Figure 16:
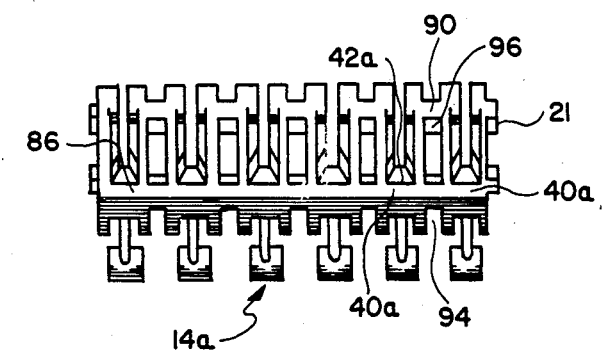
FIG. 16 is a bottom view of the conveyor link of FIGS. 12 and 13.

The link chain embodying the invention is composed of interconnected links, each of which is of identical construction and which preferably are of integral molded plastic construction. Each link 10 has a hook end 12 and a post end 14, the post end of each link capable of being interconnected to the hook end of an adjacent link to form a chain of intended length. Each link includes a central portion 16 extending across the width of the link and joining side portions 18 and 20. An arm 22 outwardly extends from central portion 16 beyond the confronting ends of the side portions 18 and 20 and to which is affixed a transversely extending post 24 which is of cylindrical cross-section and which has oppositely extending post ends. The hook end 12 of the link includes first and second curved end portions 26 and 28 which are transversely spaced by an intermediate gap 30. The end portions 26 and 28 are joined to respective side portions 18 and 20 and are also joined to central portion 16 by a web 32. The outer surfaces of end portion 26 and 28 are cylindrical as are the inner surfaces of the end portions against which portions of post 24 of an adjacent link is in rotatable engagement when the links are interconnected.

The central portion 16 includes a tooth 34 formed by beveled surfaces 36 and 38. A similar tooth 40 is provided on the opposite surface of the link formed by beveled surfaces 42 and 44. The tooth 34 of each link is in alignment with the tooth 40 of that link, and is symmetrically disposed about a plane extending through the central portion 16 orthogonal to the longitudinal axis of the link. Each side portion 18 and 20 includes beveled surfaces 46 an 48 which form an outwardly extending V-shaped side for mating with a V-pulley which can be employed to drive or guide the interconnected links. The beveled surfaces on each side portion are cut away at the hook end as shown by reference numeral 50 and at the post end as shown by reference numeral 52 such that effectively continuous beveled surfaces are provided for mating with a V-pulley. The extended ends 53 serve as stops to limit the maximum angular movement between adjacent links.

The post 24 of each link is adapted to be disposed and retained within the end portions 26 and 28 of an adjacent link, as illustrated in FIG. 7. The post is retained within the end portions by detents 29, and the post and associated end portions provide a journal bearing for relative rotation between the thus connected links. The openings 55 are mold holes for mold tooling employed in forming the detents in the illustrated embodiment. The tooth 34 and tooth 40 are each disposed midway between the axis of rotation of post 24 and axis of rotation of end portions 26 and 28. The links 10 are symmetrical about a central longitudinal plane such that either the top or bottom of the interconnected links can be driven. The pivot axis of the post end is substantially coincident with the pivot axis of the hook end of a mated link.

The chain formed of interconnected links 10 can be positively driven by an associated sprocket as shown in FIGS. 8 and 9. A sprocket wheel 60 is rotatable on a shaft 62 and includes a plurality of recesses 64 regularly spaced about the periphery of the sprocket wheel and adapted to mate with either tooth 34 or tooth 40, depending on the orientation of the links, for driving of the links of the chain. A curved transverse groove 66 is provided in the periphery of sprocket wheel 60 midway between adjacent sprocket recesses 64 to provide clearance for the pivotably interconnected ends of the links.

The link chain composed of interconnected links 10 can also be driven by a V-pulley as illustrated in FIGS. 10 and 11. The V-pulley 70 is rotatable on a shaft 72 and includes a peripheral pair of confronting flanges 74 which are outwardly tapered to provide the well known V-pulley configuration. The taper of the V-pulley flanges is adapted to mate with the taper of side surfaces 46 or 48 of links 10.

Figure 23:
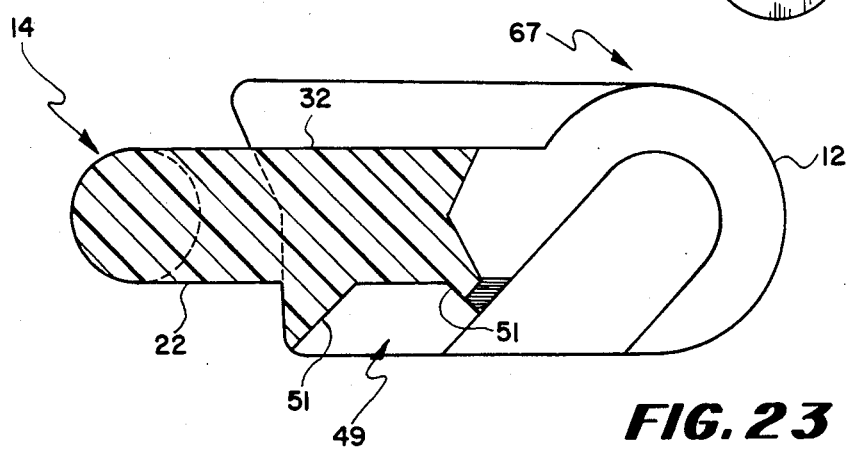
FIG. 23 is a sectional view illustrating a link having a tooth receiving recess.

As shown in FIG. 23, another link generally designated 67 of a multiple link chain embodying the present invention is driven by teeth received into recesses provided therefor on the link. The link 67 is substantially identical to that described above except that the central teeth thereof are removed, and are replaced by at least one recess generally designated 49 that is formed integrally by walls 51 that extend between the sides of the link 67. The recess 49 of the link 67 is preferably formed at an off-center location as defined between the pivot axes. The walls 51 are so inclined that the recess 49 is adapted for mating with a drive tooth of a sprocket wheel, not shown.

An embodiment is shown in FIGS. 12-21 which is especially suited to use in a conveyor chain. Referring to FIGS. 12-16, the conveyor link is composed of an array of link portions, each of which is substantially similar to the link described above in connection with the description of FIGS. 1-11. Each link portion includes a hook end 12a and a post end 14a, a central portion 16a extending across the width of the link portion and joining side portions 18a and 20a. Each central portion 16a includes a tooth 24a formed by beveled surfaces 36a and 38a. A similar tooth 40a is provided on the opposite surface of the link portion and formed by beveled surfaces 42a and 44a. The teeth 24a and 40a are in alignment such that either the top or bottom of the interconnected links can be driven or mated with an associated sprocket. The hook end includes confronting raised arcuate portions 80 and 82 which define a recess 84 into which the post end of an adjacent link is seated for rotatable engagement about the pivot axis of the mated links. As seen in FIG. 16, the link portions are joined together by intermediate sectins 86 which form a continuation of the teeth 40a. The link portions are also interconnected by web portions 90 provided between the adjacent link portions.

Figure 17:
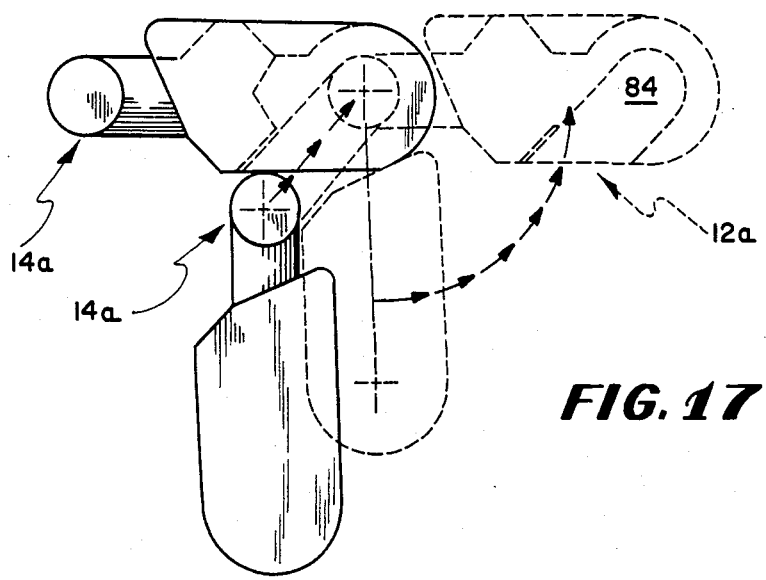
FIG. 17 is an elevation view illustrating the manner of mating of adjacent links.
Figure 18:
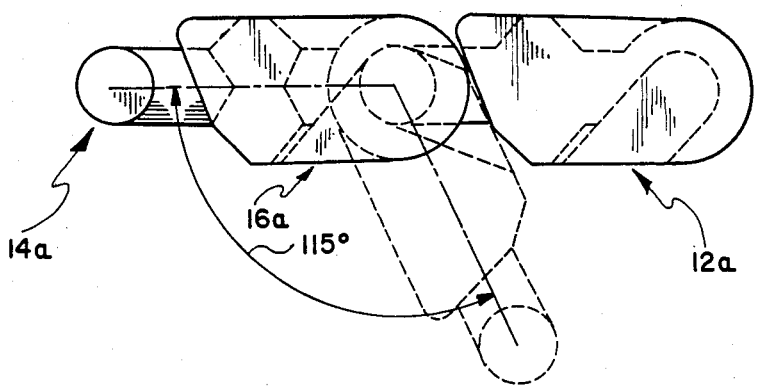
FIG. 18 is an elevation view of a pair of interconnected links illustrating the maximum angular orientation therebetween.

The links are mated with adjacent links by insertion of the post ends 14a into the confronting hook ends 12a of an adjacent link, as illustrated in FIG. 17. With one link generally perpendicular to the other link, the post ends 14a are guided into the recesses 84 of the respective hook ends, and the link is then pivoted into colinear arrangement with the mated link. Thus, the links are readily interconnected by sliding the post end of a first link into the confronting hook end of a second link and then rotating the links into position. Detachment of the links is accomplished by the reverse procedure, namely, downward rotation of one link and sliding removal of the mated ends. The mated links can rotate relative to each other over a substantial extent without disengagement. In the illustrated embodiment, the mated links can have a maximum angular orientation of about 115°, as shown in FIG. 18, before the post ends will begin to disengage from the hook ends.

The link portions of each link are joined together with webs 90 provided between adjacent hook ends, and by webs 86 in alignment between adjacent teeth 40a. As best seen in the bottom view of FIG. 16, the intermediate webs 86 and the teeth 40a form an effectively continuous tooth across the width of the link. The webs each have a surface 94 in alignment with the surfaces 42a. The webs 90 have a beveled surface 96 for added strength. Lateral extensions 21 beyond the link sides can be provided to maintain spacing between laterally adjacent links in an assembled belt, or spacing from support structures.

Figure 22:
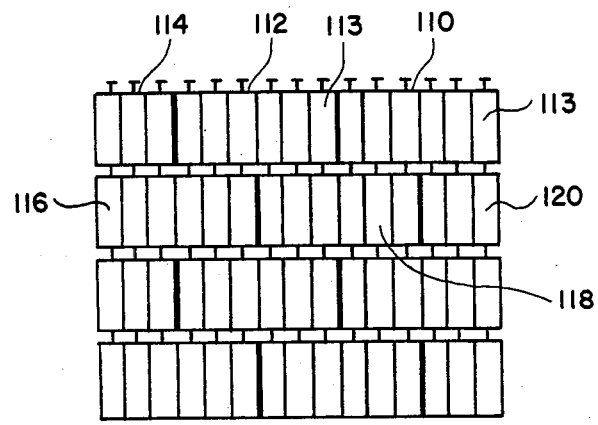
FIG. 22 is a diagrammatic view of a conveyor chain composed of links of different widths.

The conveyor links can be formed of any convenient length and width to suit intended requirements. The conveyor links can be fabricated in multiples of a given width such that a conveyor of an intended overall width can be built up by an array of interleaved links. For example, as shown in FIG. 22, two conveyor links 110 and 112, each having six portions 113 are laterally adjacent to a link 114 having three link portions. These links are mated to link 116 and 118, each of six link portions, and link 120 of three link portions in an interleaved manner, as illustrated, to provide a wide conveyor belt which retains its lateral rigidity because of the interleaved connection of the multiple width links.

Figure 19:
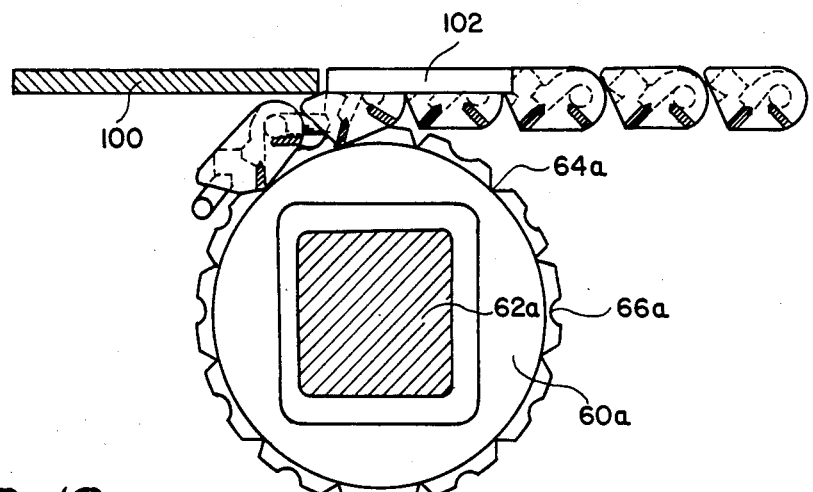
FIG. 19 is an elevation view of the conveyor link chain in engagement with a sprocket wheel and in association with a transfer comb.
Figure 20:
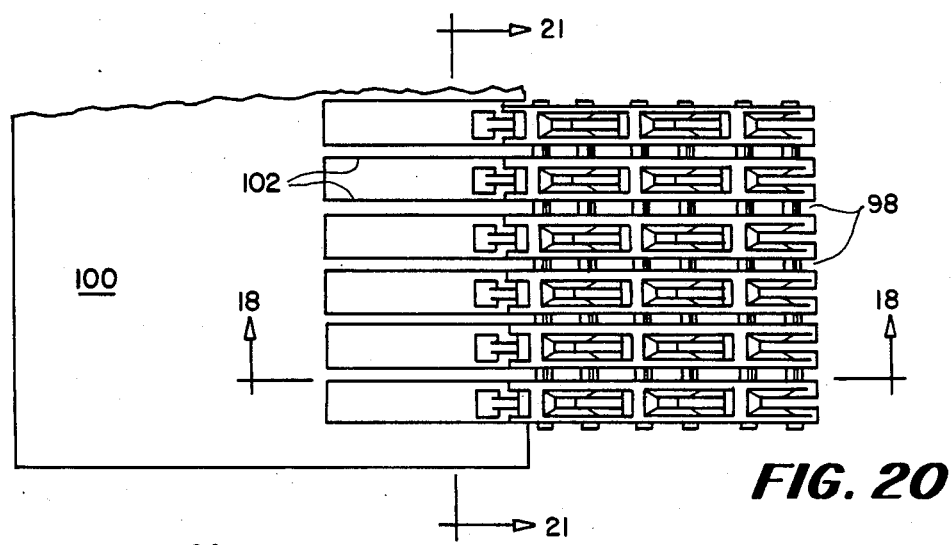
FIG. 20 is a top view of the conveyor link chain and transfer comb of FIG. 19.

The interconnected conveyor links are driven by an associated sprocket wheel as shown in FIGS. 19 and 20, similarly as described above. The sprocket wheel 60a is affixed to a square shaft 62a and includes a plurality of recesses 64a regularly spaced about the periphery of the sprocket wheel and adapted to mate with tooth 34a or 40a. A curved transverse groove 66a is provided in the periphery of the sprocket wheel midway between sprocket recesses 64a to provide clearance for the interconnected link ends. At least two spaced sprocket wheels are employed on a common shaft to drive the conveyor chain. Typically, one sprocket wheel is fixed to its driving shaft, and the other wheel is axially moveable on the shaft to accommodate movement due to thermal expansion and contraction of the links. Additional sprocket wheels can be employed across the width of the conveyor link to provide intended driving force. For some purposes, a sprocket wheel can be provided for each link portion of a conveyor link.

Figure 24:
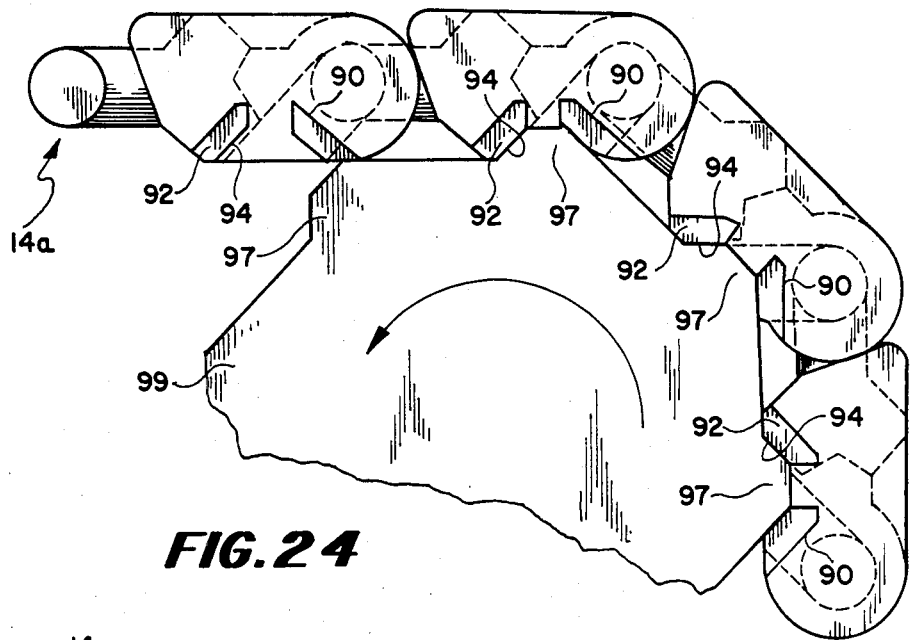
FIG. 24 is a sectional view illustrating the manner of engagement of the conveyor link of FIGS. 12 and 15 with a toothed sprocket wheel.

As seen in FIG. 24, the webs 90, 92 of the link portions define a plurality of teeth receiving recesses, and one or more teeth 97 of a sprocket wheel 99 are receivable therein to drive the confronting surfaces 94 of the several links. The extensions 21 (FIG. 12) can also be employed for this purpose. The link portions of each link of the conveyor chain can thereby be driven at one or more of the recesses of the several link portions by one or more teeth of a sprocket wheel.

Figure 21:
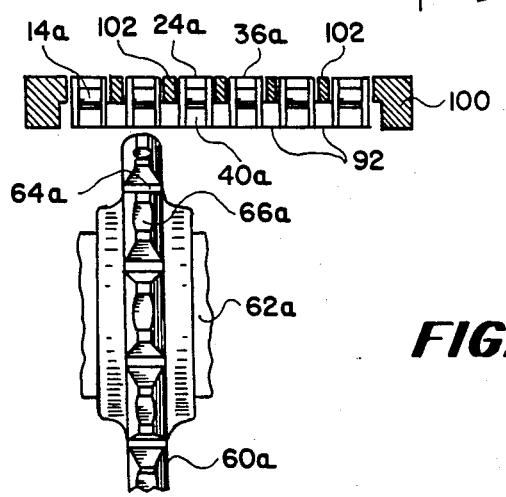
FIG. 21 is an end elevation view of the conveyor link chain, sprocket wheel, and transfer comb of FIG. 19, and taken along line 21—21 of FIG. 20.

As evident from FIG. 20, the interconnected links have longitudinal parallel channels 98, which extend along the lenght of the interconnected links such that a conveyor transfer comb can be inserted within these channels for transfer of a product onto or off of the conveyor. The comb 100 includes a plurality of parallel fingers 102, each being disposed within a longitudinal channel 98 and with its top surface substantially coplanar with the top surface of the links, as shown in Figs. 19 and 21.

An embodiment is shown in FIGS. 25–29 of a link of a link chain specially suited for use with a V-pulley. Referring to FIGS. 25–29, the link 126 includes a hook end 128 and a post end 130. A central portion 132 extends across the width of the link and joining side portions 134, and 136. Each post end 130 includes an arm 138 and a post having opposing ends 140 integrally formed therewith and transversely extending across the link 126. The hook ends 128 each have arcuate walls 142. As best seen in FIGS. 28, 29, the sides 134, 136 are each planar and so oriented as to define a link cross-section that is generally trapezoidal. It will be appreciated that the non-parallel sides of the trapezoidal cross-section defined by the sides 134, 136 define a body configuration adapted for mating with a V-pulley, not shown. A link chain composed of a plurality of identical links 126 is driven by friction on the sides of the "V" surfaces of the links, preferably employing neither teeth nor recesses.

The links of the embodiments described above are each preferably formed as a unitary structure by plastic molding. Any suitable plastic material can be employed which provides the requisite structural and environmental properties for the intended purpose.

The invention is not to be limited to what has been particularly shown and described except as indicated in the appended claims.

What is claimed is:

1. A module of integrally molded plastic for forming a conveyor belt by interconnecting a plurality of such modules, each of said modules comprising:
   a plurality of link elements integrally molded side-by-side and extending longitudinally between first and second ends, each link element comprising:
   at least one intermediate portion extending transverse to said longitudinally extending link element;
   first and second spaced apart sidewalls integrally molded with and connected by said intermediate portion, and each sidewall extending to said first end and having an inside and outside surface;
   a longitudinal portion extending toward said second end and having a preselected transverse width at said second end, said longitudinal portion integrally molded with said intermediate portion;
   a transversely extending pivot member integrally molded with and disposed on said longitudinal portion and having a preselected length, said preselected length of said pivot member selected to be larger than said preselected transverse width of said longitudinal portion, said transversely extending pivot member defining a first pivot axis;
   said first and second sidewalls defining first and second pivot member receiving areas integrally formed on corresponding ones of said first and second sidewalls, said inside surface of said sidewalls defining therebetween a transversely extending gap having a preselected lateral dimension, said preselected lateral dimension of said transversely extending gap selected to be no smaller than said transverse width of said longitudinal portion integrally molded with said central portion, said pivot member receiving areas defined by said first and said second sidewalls further defining a second pivot axis;

said preselected length of said transversely extending pivot member selected to be larger than said preselected lateral dimension defined between the inside surfaces of said sidewalls such that said pivot member and said receiving areas cooperate to pivotally join a pair of said link elements;

a first connecting member connecting adjacent ones of said plurality of link elements, said first connecting member being integrally molded with said link elements at first points intermediate the first and second link ends; and a second connecting member connecting adjacent ones of said plurality of link elements, said second connecting member being integrally molded with said link elements at second points intermediate said first points and said second link ends, said first and second connecting members of adjacent link elements cooperating to form teeth receiving recesses for receiving a conveyor sprocket wheel.

* * * * *